United States Patent
Kameno et al.

(10) Patent No.: US 8,655,264 B2
(45) Date of Patent: Feb. 18, 2014

(54) COMMUNICATION SYSTEM, BASE STATION DEVICE, MOBILE STATION DEVICE, AND COMMUNICATION METHOD

(75) Inventors: Toshiaki Kameno, Osaka (JP); Koichi Tsunekawa, Osaka (JP); Katsutoshi Ishikura, Osaka (JP); Yoshio Konno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 294 days.

(21) Appl. No.: 13/126,442

(22) PCT Filed: Oct. 14, 2009

(86) PCT No.: PCT/JP2009/005370
§ 371 (c)(1),
(2), (4) Date: May 16, 2011

(87) PCT Pub. No.: WO2010/052832
PCT Pub. Date: May 14, 2010

(65) Prior Publication Data
US 2011/0217961 A1   Sep. 8, 2011

(30) Foreign Application Priority Data
Nov. 6, 2008   (JP) .............................. P2008-285749

(51) Int. Cl.
*H04H 20/71* (2008.01)
*H04H 40/00* (2008.01)

(52) U.S. Cl.
USPC ... 455/3.01; 455/3.06; 455/414.1; 455/456.1; 455/456.3; 455/515; 455/435.1; 370/312

(58) Field of Classification Search
USPC ............... 455/516, 414.1, 415, 414.2, 435.1, 455/422.1, 515, 3.01, 3.06, 456.1–456.6; 370/310.1, 312, 328, 338
See application file for complete search history.

(56) References Cited

U.S. PATENT DOCUMENTS

| | | | |
|---|---|---|---|
| 2007/0249282 A1* | 10/2007 | Shaheen | 455/3.06 |
| 2008/0101317 A1* | 5/2008 | Bouazizi | 370/342 |
| 2008/0132263 A1* | 6/2008 | Yu et al. | 455/515 |
| 2008/0268878 A1 | 10/2008 | Wang et al. | |
| 2010/0008234 A1* | 1/2010 | Ulupinar et al. | 370/241 |

OTHER PUBLICATIONS

3GPP TS 25.211 V8.7.0 (Sep. 2010), 5.3.3.10., "Paging Indicator Channel (PICJ)", Sep. 2010, 3rd Generation Partnership Project; Technical Specification Group Radio Access Network; Physical channels and mapping of transport channels onto physical channels (FDD), Release 8.

(Continued)

*Primary Examiner* — Ajit Patel
(74) *Attorney, Agent, or Firm* — Birch, Stewart, Kolasch & Birch, LLP (57) ABSTRACT

A communication system includes a unicast base station device, a multicast base station device, and a mobile station device. Before receiving information concerning a multicast service, the mobile station device transmits, to a position register server, identification information identifying a reception area in which a multicast service is provided. When receiving incoming call information indicating that information concerning a unicast service has been received, the multicast base station device transmits the incoming call information to the mobile station device. The mobile station device receives the incoming call information even while receiving the information concerning the multicast service.

12 Claims, 5 Drawing Sheets

(56) References Cited

OTHER PUBLICATIONS

3GPP TS 25.304 V8.11.0 (Sep. 2010), 8., "Paging and SCCPCH Selection", 3rd Generation Partnership Project; Technical Specification Group Radio Access Network; User Equipment (UE) procedures in idle mode and procedures for cell reselection in connected mode, Release 8.

3GPP TS 36.300 V8.5.0 (May 2008), 15.2, "MBMS Cells", 3rd Generation Partnership Project; Technical Specification Group Radio Access Network; E-UTRA and E-UTRAN; Overall description; Stage 2; Release 8.

Alcatel, "Discussion of MBMS dedicated cell and paging configuration", TSG-RAN WG2 meeting #55, Agenda item 11.9, R2-063284, Nov. 6-10, 2006, Riga, Latvia.

LG Electronics, "Priority and MBMS PL Service Restriction", 3GPP TSG-RAN WG2 #53, Agenda item 8.2, R2-061768, May 8-12, 2006, Shanghai, China.

* cited by examiner

COMMUNICATION SYSTEM, BASE STATION DEVICE, MOBILE STATION DEVICE, AND COMMUNICATION METHOD

TECHNICAL FIELD

The present invention relates to a communication system, a base station device, a mobile station device, and a communication method.

Priority is claimed on Japanese Patent Application No. 2008-285749, filed Nov. 6, 2008, the content of which is incorporated herein by reference.

BACKGROUND ART

Regarding a reception method on a mobile station device side, it is stipulated by 3GPP (Third Generation Partnership Project), which works on standardization of the field of mobile communication, that presence of an incoming call is notified to a mobile station device, the position of which is registered to a network, using a paging signal including a paging message and a paging identifier allocated to the paging signal (see, for example, Non-Patent Documents 1 and 2). Bilateral communication, which is called Point-to-Point connection (which is also called unicast), is established for the notification (notification of the incoming call). Hereinafter, services provided by Point-to-Point connection (unicast) are called unicast services.

As technique of distributing content and the like, MBMS (Multimedia Broadcast/Multicast Service) has been known. The MBMS is a broadcast/multicast service using the mobile packet network. In general, unilateral communication, which is called Point-to-Multipoint connection (which is also called multicast) by which content and the like can be simultaneously transmitted to multiple users, is established for connection for the MBMS. Accordingly, the connection for the incoming call and the connection for the MBMS are different connection modes. Hereinafter, services provided by the Point-to-Multipoint connection (multicast) are called multicast services.

At the present, two communication schemes, which are mixed-MBMS and dedicated-MBMS, are specified for the MBMS (see, for example, Non-Patent Document 3). The mixed-MBMS is a communication scheme using time-division multiplexing, in which communication for unicast services and communication for the MBMS that is multicast services are performed. On the other hand, the dedicated-MBMS is a reception-dedicated communication scheme using a frequency band dedicated for the MBMS that is a multicast service. In any of the above two schemes, transmission of MBMS can be implemented by SFN (Single Frequency Network, which is also called single frequency relay). The MBMS implemented by the SFN is called MBSFN (MBMS SFN).

CITATION LIST

Non-Patent Document

[Non-Patent Document 1] 3GPP TS25.211 5.3.3.10. "Paging Indicator Channel (PICH)"
[Non-Patent Document 2] 3GPP TS25.304 8. "Paging and SCCPCH selection"
[Non-Patent Document 3] 3GPP TS36.300 V8.5.0 15.2 "MBMS Cells"

DISCLOSURE OF THE INVENTION

Problems to be Solved by the Invention

However, a mobile station device, which is compatible with unicast services and reception-dedicated multicast services (e.g., dedicated-MBMS) using a dedicated frequency band, has a problem in that the mobile station device cannot receive an incoming call notification from the unicast services while receiving reception-dedicated multicast services using the dedicated frequency band. In other words, a user of the mobile station device, which is compatible with unicast services and reception-dedicated multicast services using a dedicated frequency band, has a problem in that the user cannot recognize an incoming call notification from the unicast services even in a reception area of the unicast services while receiving the reception-dedicated multicast services using the dedicated frequency band. Regarding an incoming call notification from unicast services during reception of dedicated-MBMS, there is no particular stipulation by the 3GPP at the present (see, for example, section 15.2 of Non-Patent Document 3).

The present invention is made in consideration of the above problems. An object of the present invention is to provide a simple technology for a mobile station device, which is compatible with unicast services and reception-dedicated multicast services using a dedicated frequency band, to receive an incoming call notification from the unicast services even while receiving the reception-dedicated multicast services using the dedicated frequency band.

Means for Solving the Problems

To solve the above problems, a communication system of a first embodiment of the present invention includes: a unicast base station device that is a base station device that establishes connection to a network providing a unicast service and a multicast service, and relays information concerning the unicast service; a multicast base station device that is a base station device that establishes connection to the network and relays information concerning the multicast service; and a mobile station device that communicates with the unicast base station device and the multicast base station device. The multicast base station device includes: a network communication unit; a base station side radio communication unit; and a base station side control unit that controls the network communication unit and the base station side radio communication unit. The mobile station device includes: a mobile station side radio communication unit; a mobile station side control unit that controls the mobile station side radio communication unit. The mobile station side control unit controls the mobile station side radio communication unit to transmit identification information to a position registration server in the network via the unicast base station device before the information concerning the multicast service is received from the multicast base station device, the identification information identifying a reception area in which the multicast service is provided. When the network communication unit receives incoming call information addressed to the mobile station device, the base station side control unit controls the base station side radio communication unit to transmit the incoming call information to the mobile station device, the identification information of the mobile station device being registered to the position register server, and the incoming call information indicating that the information concerning the unicast service has been received. While the information concerning the multicast service is received from the multicast base station device, the mobile station side control unit controls the mobile station side radio communication unit to receive the incoming call information transmitted from the multicast base station device.

Regarding the communication system, if the mobile station side radio communication unit receives the incoming call information while the mobile station side control unit controls the mobile station side radio communication unit to receive the incoming call information while the information concerning the multicast service is received from the multicast base station device, the mobile station side control unit may control the mobile station side radio communication unit to terminate receiving the information concerning the multicast service from the multicast base station and to transmit and receive the information concerning the unicast service to and from the unicast base station device.

Regarding the communication system, if the mobile station side radio communication unit receives the incoming call information while the mobile station side control unit controls the mobile station side radio communication unit to receive the incoming call information while the information concerning the multicast service is received from the multicast base station device, the mobile station side control unit may control, according to an instruction from a user of the mobile station device, the mobile station side radio communication unit to terminate receiving the information concerning the multicast service from the multicast base station and to transmit and receive the information concerning the unicast service to and from the unicast base station device.

Regarding the communication system, the base station side control unit may control the base station side radio communication unit to transmit the information concerning the multicast service by a communication using a cell for distributing multimedia. The mobile station side control unit may control the mobile station side radio communication unit to receive the information concerning the multicast service by the communication using the cell for distributing multimedia.

Regarding the communication system, the base station side control unit may control the base station side radio communication unit to transmit the incoming call information using a broadcast channel transmitted to all the cell for distributing multimedia. The mobile station side control unit may control the mobile station side radio communication unit to receive the incoming call information using the broadcast channel.

Regarding the communication system, the base station side control unit may control the base station side radio communication unit to transmit the incoming call information using a paging channel to be transmitted in a predetermined timing. The mobile station side control unit may control the mobile station side radio communication unit to receive the incoming call information using the paging channel.

To solve the above problems, a base station device of a second embodiment of the present invention establishes connection to a network providing a unicast service and a multicast service, and relays information concerning the unicast service. The base station device includes: a network communication unit; a radio communication unit; and a control unit that controls the network communication unit and the radio communication unit. When the network communication unit receives incoming call information addressed to the mobile station device, the control unit controls the radio communication unit to transmit the incoming call information to the mobile station device, identification information of the mobile station device being registered to a position register server in the network, the identification information identifying a reception area in which the multicast service is provided, and the incoming call information indicating that the information concerning the unicast service has been received.

To solve the above problems, a mobile station device of a third embodiment of the present invention communicates with a unicast base station device and a multicast base station device, the unicast base station device being a base station device that establishes connection to a network providing a unicast service and a multicast service and relays information concerning the unicast service, the multicast base station device being a base station device that establishes connection to the network and relays information concerning the multicast service. The mobile station device includes: a radio communication unit; and a control unit that controls the radio communication unit. The control unit controls the radio communication unit to transmit identification information to a position registration server in the network via the unicast base station device before the information concerning the multicast service is received from the multicast base station device, the identification information identifying a reception area in which the multicast service is provided. The control unit controls the radio communication unit to receive, while the information concerning the multicast service is received from the multicast base station device, incoming call information transmitted from the multicast base station device, the incoming call information indicating that the information concerning the unicast service has been received.

Regarding the mobile station device, the radio communication unit may include a plurality of transmission and reception antennas that perform MIMO transmission and reception.

To solve the above problems, a communication method of a fourth embodiment of the present invention is provided for a communication system. The communication system includes: a unicast base station device that is a base station device that establishes connection to a network providing a unicast service and a multicast service, and relays information concerning the unicast service; a multicast base station device that is a base station device that establishes connection to the network and relays information concerning the multicast service; and a mobile station device that communicates with the unicast base station device and the multicast base station device. The communication method includes: a step of transmitting, when receiving incoming call information addressed to the mobile station device, the incoming call information to the mobile station device, the incoming call information indicating that the information concerning the unicast service has been received, identification information of the mobile station device being registered to a position register server in the network, and the identification information identifying a reception area in which the multicast service is provided; a step of the mobile station device transmitting, before receiving the information concerning the multicast service from the multicast base station device, the identification information to the position register server via the unicast base station device; and a step of the mobile station device receiving the incoming call information from the multicast base station device while receiving the information concerning the multicast service from the multicast base station device.

To solve the above problems, a communication method of a fifth embodiment of the present invention is provided for a base station device that establishes connection to a network providing a unicast service and a multicast service, and relays information concerning the unicast service to a mobile station device. The communication method includes: a step of transmitting, when receiving incoming call information addressed to the mobile station device, the incoming call information to the mobile station device, identification information of the mobile station device being registered to a position register server in the network, the identification information identifying a reception area in which the multicast service is provided, and the incoming call information indicating that the information concerning the unicast service has been received.

To solve the above problems, another communication method of a sixth embodiment of the present invention is provided for a mobile station device that communicates with a unicast base station device and a multicast base station device, the unicast base station device being a base station device that establishes connection to a network providing a unicast service and a multicast service and relays information concerning the unicast service, the multicast base station device being a base station device that establishes connection to the network and relays information concerning the multicast service. The communication method includes: a step of transmitting, before receiving the information concerning the multicast service from the multicast base station device, identification information to a position registration server in the network via the unicast base station device, the identification information identifying a reception area in which the multicast service is provided; and a step of receiving incoming call information transmitted from the multicast base station device while receiving the information concerning the multicast service from the multicast base station device, the incoming call information indicating that the information concerning unicast service has been received.

Effects of the Invention

According to the present invention, a mobile station device, which is compatible with unicast services and reception-dedicated multicast services using a dedicated frequency band, can receive, by a simple method, an incoming call notification from the unicast services even while receiving the reception-dedicated multicast services using the dedicated frequency band.

BEST MODE FOR CARRYING OUT THE INVENTION

Figure 1:
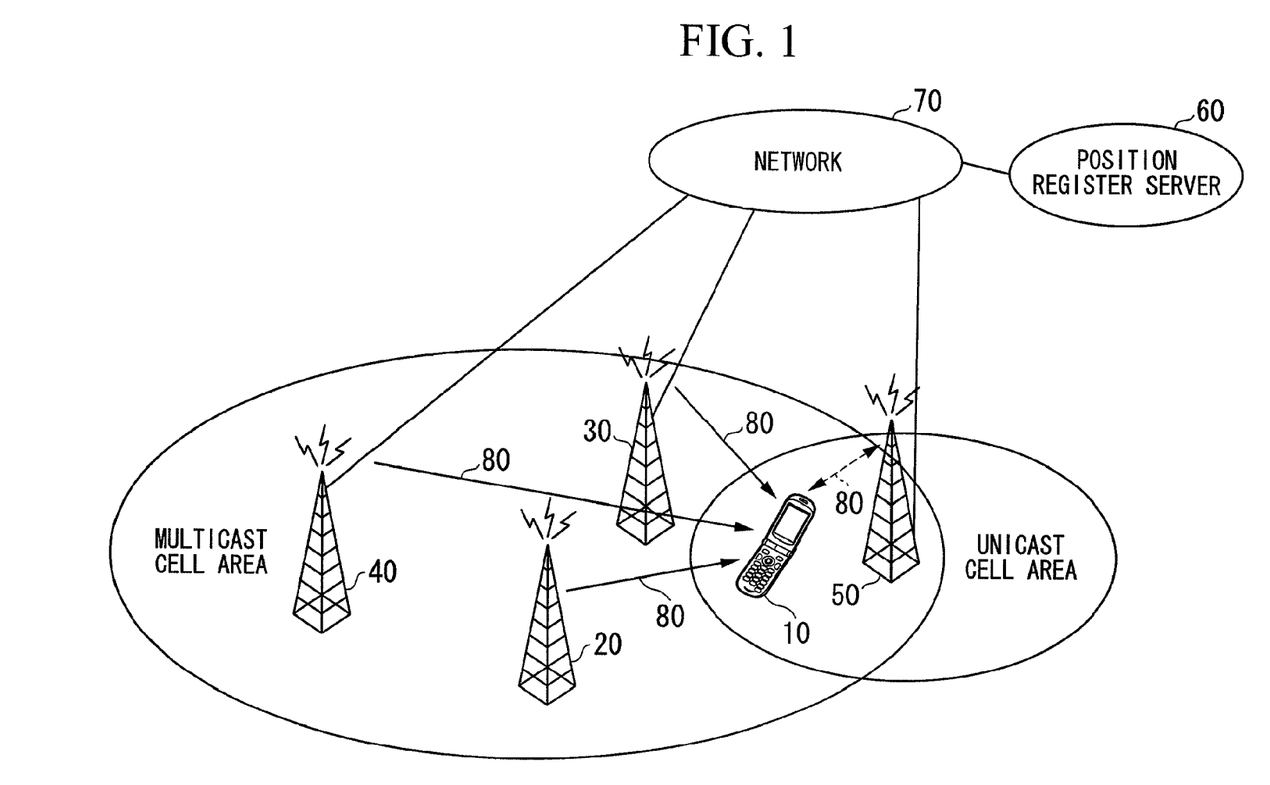
FIG. 1 is a conceptual diagram illustrating a communication system according to an embodiment of the present invention.

Hereinafter, an embodiment of the present invention is explained with reference to the accompanying drawings. FIG. 1 is a conceptual diagram illustrating a communication system according to an embodiment of the present invention. The communication system includes a mobile station device 10 and base station devices 20, 30, 40, and 50, which are shown in FIG. 1. In addition to the mobile station device 10, the base station devices 20, 30, 40, and 50, and a position register server 60 (which is also called HLS (Home Location Register)), non-depicted various servers (for example, a server providing unicast services, and a server providing multicast services such as dedicated-MBMS) are connected to a network 70 shown in FIG. 1. A reference numeral 80 denotes a radio access network connecting the mobile station device 10 and each base station device.

The base station device 20 (which is also called a multicast base station device, an MBMS base station, and an MBSFN base station device) establishes connection to the network 70 and relays information concerning multicast services (which is called a MBMS signal). The same applies to the base station devices 30 and 40. The information concerning multicast services includes content, such as sounds, and images (moving images and still images). A multicast cell shown in FIG. 1 is a cell area for distributing multimedia, i.e., a multicast service reception area. In the multicast cell area, the mobile station device 10 enters a state of being able to receive information concerning multicast services (which is also called a multicast waiting state). One example of the multicast cell area is a cell area of MBSFN (which is also called an MBSFN cell area). The multicast cell area is identified by identification information (e.g., identification information identifying the MBSFN cell area, which is also called MBSFN-ID). In other words, for example, multicast cell area A providing a multicast service a and multicast cell area B providing a multicast service b can be distinguished from each other by the identification information.

The base station device 50 (which is also called a unicast base station device) establishes connection to the network 70, and relays information concerning unicast services. The information concerning unicast services includes, for example, verbal communication, video communication, packet communication, and the like. A unicast cell area shown in FIG. 1 is a reception area for the unicast base station device 50, i.e., a unicast service reception area. In the unicast cell area, the mobile station device 10 enters a state of being able to receive information concerning unicast services (which is also called a unicast waiting state).

The mobile station device 10 communicates with the multicast base station devices 20, 30, and 40, and the unicast base station device 50. Specifically, the mobile station device 10 receives information concerning multicast services from the multicast base station devices 20, 30, and 40. Then, the mobile station device 10 transmits and receives information concerning unicast services to and from the unicast base station device 50. A radio access network 80, which connects the mobile station device 10 and each base station device, is implemented by the communication access technology (which is also called a radio access technology), such as W-CDMA, CDMA 2000, and OFDM. For simplification, it is assumed that the radio access network 80 is implemented by the OFDM technology.

According to FIG. 1, the mobile station device 10 is positioned in the multicast cell area and the unicast cell area. Therefore, the mobile station device 10 can utilize multicast services provided from the network 70 (server providing multicast services) via the multicast base station devices 20, 30, and 40, and unicast services provided from the network 70 (server providing unicast services) via the unicast base station device 50. Additionally, while receiving information concerning a multicast service, the mobile station device 10 can receive incoming call information indicating receipt of information concerning a unicast service (for example, incoming call notification of verbal communication), and the details thereof will be explained later.

In case of MBSFN, the mobile station device 10 receives and demodulates at least one signal from the multicast base station devices 20, 30, and 40, and receives a multicast service. In case of unicast services, on the other hand, the mobile station device 10 establishes connection to the unicast base station device 50, and receives a desired unicast service.

Although the communication system according to the embodiment of the present invention includes three multicast base station devices 20, 30, and 40 as shown in FIG. 1, the number of multicast base station devices is just an example, and one or multiple multicast base station devices may be included. Similarly, although the communication system according to the embodiment of the present invention includes one unicast base station device 50 as shown in FIG. 1, the number of unicast base station devices is just an example, and multiple unicast base station devices may be included. The server providing multicast services includes one or multiple devices, and performs various processes concerning multicast services (such as distribution, authentication, permission, charging, and bandwidth control). The server providing unicast services includes one or multiple devices, and performs various processes concerning unicast services (such as exchange (call control), protocol conversion, authentication, permission, charging, bandwidth control). Operations and functions of the multicast base station devices 20, 30, and 40 are the same. Therefore, only operations and functions of the multicast base station device 20 is explained hereinafter.

Figure 2A:
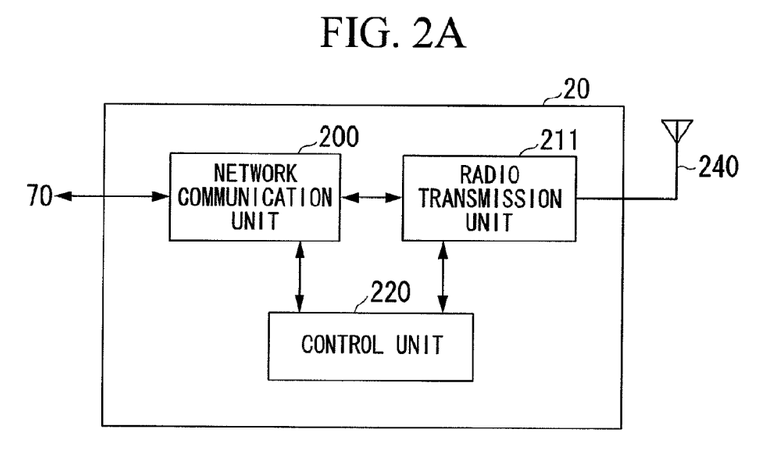
FIG. 2A is a schematic block diagram illustrating a configuration of a multicast base station device according to the embodiment of the present invention.
Figure 2B:
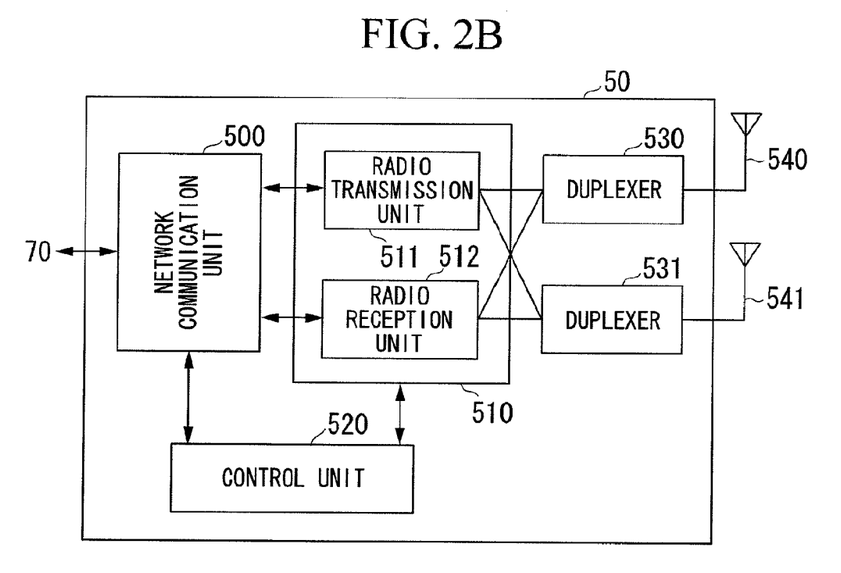
FIG. 2B is a schematic block diagram illustrating a configuration of a unicast base station device according to the embodiment of the present invention.

Hereinafter, configurations of the multicast base station device 20 and the unicast base station device 50 are explained. FIG. 2A is a schematic block diagram illustrating the configuration of the multicast base station device. FIG. 2B is a schematic block diagram illustrating the configuration of the unicast base station device.

As shown in FIG. 2A, the multicast base station device 20 includes: a network communication unit 200; a radio transmission unit 211 (which is also called a radio communication unit or a base station side radio communication unit); a control unit 220 (which is also called a base station side control unit); and an antenna unit 240.

The antenna unit 240 performs transmission of OFDM signals using a radio frequency bandwidth. The control unit 220 controls the network communication unit 200 and the radio transmission unit 211. The network communication unit 200 and the radio transmission unit 211 perform various operations under control of the control unit 220.

For example, the control unit 220 controls the network communication unit 200 to receive information concerning a multicast service from the network 70 (server providing multicast services). The network communication unit 200 may receive information concerning a multicast service from the network 70 without control of the control unit 220.

The control unit 220 controls the network communication unit 200 to receive, from the network 70 (server providing multicast services), incoming call information indicating receipt of information concerning a unicast service, which is incoming call information addressed to the mobile station device 10, the identification information of which (for example, MBSFN-ID) is registered to the network 70 (position register server 60). Upon receipt of information concerning a unicast service addressed to the mobile station device 10, the identification information of which is registered to the network 70 (position register server 60), the network 70 (server providing multicast services) transmits the incoming call information to the multicast base station device 20.

The control unit 220 may control the network communication unit 200 to receive the incoming call information from the server providing unicast services or the position register server 60, in lieu of the server providing multicast services. The network communication unit 200 may receive the incoming call information from the network 70 (the server providing multicast services, the server providing unicast services, or the position register server 60) without the control of the control unit 220.

The control unit 220 controls the radio transmission unit 211 to transmit information concerning a multicast service to the mobile station device 10.

The control unit 220 controls the radio transmission unit 211 to transmit, to the mobile station device 10, incoming call information indicating receipt of the information concerning a unicast service. More specifically, if the network communication unit 200 receives incoming call information from the network 70 (the server providing multicast services, the server providing unicast services, or the position register server 60), the control unit 220 controls the radio transmission unit 211 to transmit the incoming call information to the mobile station device 10.

As shown in FIG. 2B, the unicast base station device 50 includes: a network communication unit 500 (which is simply called a communication unit); a radio communication unit 510; a control unit 520; a duplexer 530; a duplexer 531; an antenna unit 540; and an antenna unit 541. The radio communication unit 510 includes a radio transmission unit 511 and a radio reception unit 512.

The antenna unit 540 and the antenna unit 541 perform transmission and reception of OFDM signals using a radio frequency band. The reason that two antennas of the antenna unit 540 and the antenna unit 542 are included is to perform 2×2 MIMO (Multiple Input/Multiple Output) unicast communication. However, the unicast communication is not limited to 2×2 MIMO, and may be SISO (Single Input/Single Output), 4×4 MIMO, and the like. The duplexer 540 performs a process for the antenna unit 540 to share transmission and reception signals. Similarly, the duplexer 531 performs a process for the antenna unit 541 to share transmission and reception signals.

The control unit 520 controls the network communication unit 500 and the radio communication unit 510. The network communication unit 500 and the radio communication unit 510 perform various operations under control of the control unit 520.

For example, the control unit 520 controls the network communication unit 500 to receive information concerning unicast services from the network 70 (server providing unicast services). The network communication unit 500 may receive information concerning unicast services from the network 70 (server providing unicast services) without the control of the control unit 520. The information concerning unicast services received from the network 70 (server providing unicast services) includes incoming call information indicating receipt of the information concerning a unicast service.

The control unit 520 controls the network communication unit 500 to transmit the information concerning a unicast service to the network 70 (server providing unicast services).

The control unit 520 controls the network communication unit 500 to transmit position information concerning unicast services to the network 70 (server providing unicast services).

The control unit 520 controls the network communication unit 500 to transmit identification information (for example, MBSFN-ID) to the network 70 (position register server 60).

The control unit 520 controls the radio communication unit 510 (radio transmission unit 511) to transmit information concerning unicast services to the mobile station device 10. The information concerning unicast services to be transmitted to the mobile station device 10 includes incoming call information indicating receipt of the information concerning a unicast service.

The control unit 520 controls the radio communication unit 510 (radio reception unit 512) to receive information concerning a unicast service from the mobile station device 10. The radio communication unit 510 (radio reception unit 512) may receive information concerning a unicast service from the mobile station device 10 without the control of the control unit 520. The information concerning a unicast service received from the mobile station device 10 includes position information concerning the unicast service.

The control unit 520 controls the radio communication unit 510 (radio reception unit 512) to receive identification information (for example, MBSFN-ID) from the mobile station device 10. The radio communication unit 510 (radio reception unit 512) may receive identification information (for example, MBSFN-ID) from the mobile station device 10 without the control of the control unit 520.

Figure 3:
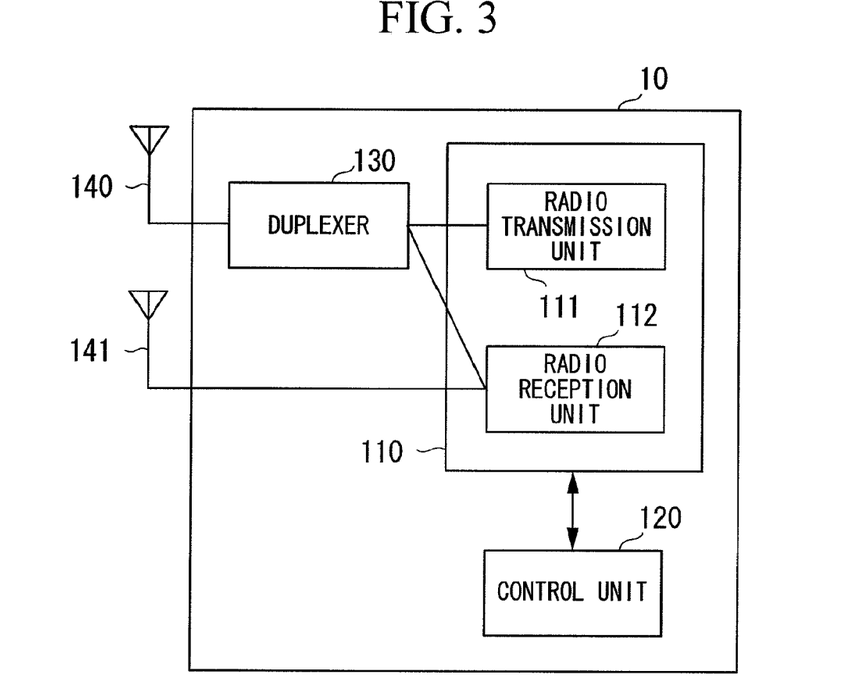
FIG. 3 is a schematic block diagram illustrating a configuration of a mobile station device according to the embodiment of the present invention.

Hereinafter, a configuration of the mobile station device 10 is explained. FIG. 3 is a schematic block diagram illustrating the mobile station device 10. As shown in FIG. 3, the mobile station device 10 includes: a radio communication unit 110 (which is also called a mobile station side radio communication unit); a control unit 210 (which is also called a mobile station side control unit); a duplexer 130; a duplexer 131; an antenna 140; and an antenna 141. The radio communication unit 110 includes a radio transmission unit 111 and a radio reception unit 112.

The antenna unit 140 and the antenna unit 141 perform transmission and reception of OFDM signals using a radio frequency band. The antenna 140 is an antenna for transmitting and receiving information concerning a unicast service. The antenna 141 is an antenna for receiving information concerning a multicast service. The duplexer 130 performs a process for the antenna unit 140 to share transmission and reception signals. 2×2 MIMO communication can be performed with use of the two antenna units of the antenna unit 140 and the antenna unit 141. Although a transmission signal is transmitted using only the antenna unit 140 as shown in FIG. 3, one duplexer may be added to perform transmission using the antenna units 140 and 141, when the two antennas 140 and 141 are used to achieve transmission diversity and the like.

The control unit 120 controls the radio communication unit 110. The radio communication unit 110 performs various operations under control of the control unit 120.

For example, the control unit 120 controls the radio communication unit 110 (radio transmission unit 111) to transmit information concerning a unicast service to the unicast base station device 50. The information concerning a unicast service to be transmitted to the unicast base station device 50 includes position information concerning the unicast service.

The control unit 120 controls the radio communication unit 110 (radio transmission unit 111) to transmit identification information (for example, MBSFN-ID) to the unicast base station device 50. More specifically, the control unit 120 controls the radio communication unit 110 (radio transmission unit 111) to transmit identification information to the unicast base station device 50 before information concerning a multicast service is received from the multicast base station device 20.

The control unit 120 controls the radio communication unit 110 (radio reception unit 112) to receive information concerning a unicast service from the unicast base station device 50. The information concerning a unicast service received from the unicast base station device 50 includes incoming call information indicating receipt of information concerning a unicast service.

The control unit 120 controls the radio communication unit 110 (radio reception unit 112) to receive information concerning a multicast service from the multicast base station device 20.

The control unit 120 controls the radio communication unit 110 (radio reception unit 112) to receive, from the multicast base station device 20, incoming call information indicating receipt of information concerning a unicast service. More specifically, the control unit 120 controls the radio communication unit 110 (radio reception unit 112) to receive, from the multicast base station device 20, the incoming call information while the mobile station device 10 receives information concerning a multicast service from the multicast base station device 20.

The control unit 120 controls the radio communication unit 110 (radio reception unit 112) to terminate reception of information concerning a multicast service from the multicast base station device 20. More specifically, when the mobile station device receives incoming call information concerning a unicast service from the multicast base station device 20 while the mobile station device 10 receives information concerning a multicast service from the multicast base station device 20, the control unit 120 controls the radio communication unit 110 (radio reception unit 112) to terminate reception of information concerning a multicast service from the multicast base station device 20.

Although an illustration is omitted (not shown) in FIG. 3, the mobile station device 10 includes a user interface, and a storing unit that stores various information pieces. The user interface includes, for example, various buttons, a microphone, a speaker, a screen (monitor), an LED (Light Emitting Diode), a vibration generating motor, and the like. Information stored in the storing unit includes, for example, user information such as an address, system information such as setting information, and the like.

Figure 4:
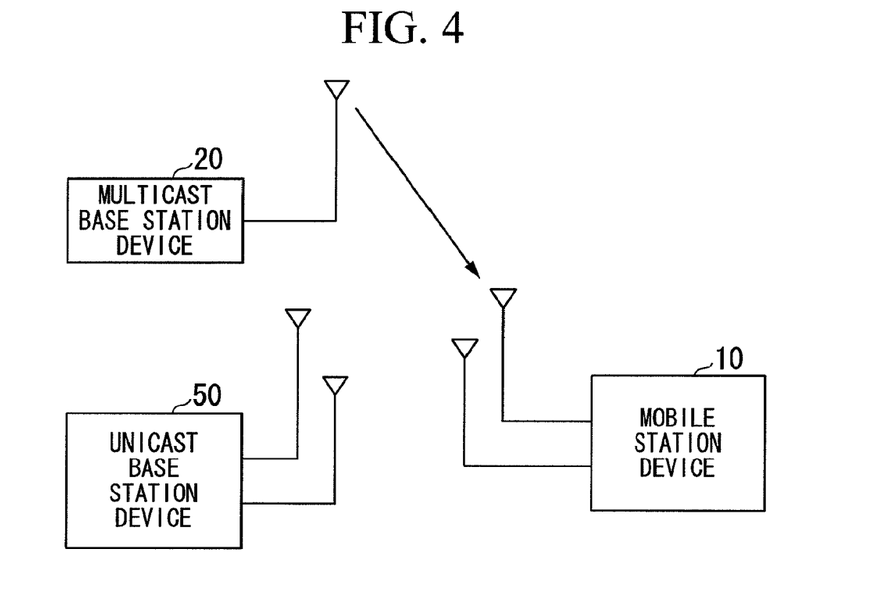
FIG. 4 illustrates operations of the mobile station device, the multicast base station device, and the unicast base station device according to the embodiment of the present invention.
Figure 5:
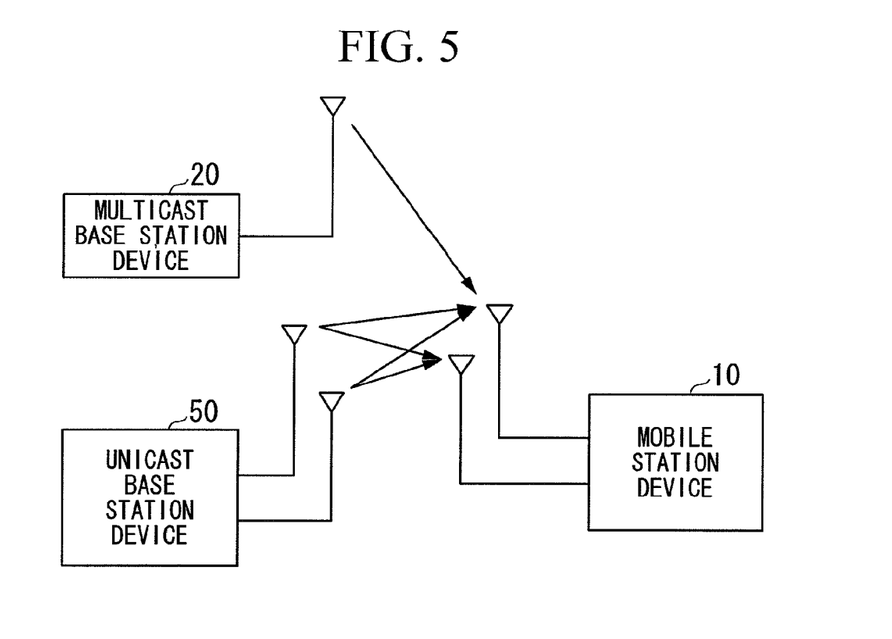
FIG. 5 illustrates operations of the mobile station device, the multicast base station device, and the unicast base station device according to the embodiment of the present invention.

FIGS. 4 and 5 illustrate operations of the mobile station device 10, the multicast base station device 20, and the unicast base station device 50. It is assumed here that the mobile station device 10 is positioned in the multicast cell area and in the unicast cell area at the same time.

In the multicast and unicast waiting states, the mobile station device 10 enters a state of receiving information concerning a multicast service from the multicast base station device 20 (which is called a multicast communication state), according to an instruction from a user (operation indicating an order to receive information concerning a multicast service) or automatically according to the setting, as shown in FIG. 4. In other words, in the multicast and unicast waiting states, the control unit 120 controls, according to an instruction received from the user through various buttons or the like or to the setting stored in the storing unit, the radio communication unit 110 to receive information concerning a multicast service from the multicast base station device 20.

Upon entering the multicast communication state, the mobile station device 10 searches (detects) receivable multicast services. In other words, the control unit 120 controls the radio communication unit 110 to search receivable multicast services. Specifically, if the mobile station device 10 is in other communication at the time of searching receivable multicast services, the mobile station device 10 disconnects the communication in execution, and enters an idle state. In a timing in the idle state in which a call to the mobile station device 10 is not performed, the mobile station device 10 searches multicast services in a frequency band in which multicast services might be provided.

If the mobile station device 10 detects one multicast service, the mobile station device 10 determines the one multicast service detected as a multicast service to be received. If the mobile station device 10 detects multiple multicast services, the mobile station device 10 determines one of the multicast services detected based on user selection or the setting. The control unit 120 controls the determination.

When the mobile station device 10 determines the multicast service to be received, the mobile station device 10 notifies, through the unicast base station device 50, the network 70 (position register server 60) of identification information (for example, MBSFN-ID) identifying a multicast cell area in which the multicast service detected is provided. In other words, the control unit 120 controls the radio communication unit 110 to transmit the identification information to the unicast base station device 50. The mobile station device 10 obtains the identification information from the multicast base station device 20. In other words, the control unit 120 controls the radio communication unit 110 to obtain the identification information from the multicast base station device 20 providing the multicast service. For example, when the mobile station device 10 enters the multicast communication state, more specifically, when the controller 120 determines the multicast service, the control unit 120 controls the radio communication unit 110 to obtain the identification information from the multicast base station device 20 providing the multicast service determined. The radio communication unit 110 may receive the identification information from the multicast base station device 20 without the control of the control unit 120. If multiple base station devices 20, 30, and 40 simultaneously transmit identification information pieces, the mobile station device 10 may combine signals from the base station devices 20, 30, and 40 to obtain an identification signal.

It has been explained that the mobile station device 10 obtains the identification information from the multicast base station device 20 when to enter the multicast communication state. However, the timing in which the mobile station device 10 obtains the identification information from the multicast base station device 20 is not limited thereto. For example, when the mobile station device 10 enters a multicast cell area, the mobile station device 10 may obtain the identification information from the multicast base station device 20 providing multicast services in the multicast cell area. In other words, when the mobile station device 10 enters a multicast cell area, the control unit 120 may control the radio communication unit 110 to obtain the identification information from the multicast base station device 20 providing multicast services in the multicast cell area.

It has been explained that when the mobile station device 10 determines a multicast service to be received, i.e., when the mobile station device 10 enters the multicast communication state, the mobile station device 10 notifies the network 70 (position register server 60) of the identification information. However, the timing, in which the mobile station device 10 notifies the network 70 (position register server 60) of the identification information, is not limited thereto. For example, when the mobile station device 10 obtains identification information from the multicast base station device 20 upon entering the multicast cell area, the mobile station device 10 may immediately notify the network 70 (position register server 60) of the identification information obtained.

The mobile station device 10, which has notified the network 70 of the identification information, initiates the multicast service. In other words, the controller 120 controls the radio communication unit 110 to receive information concerning the multicast service from the multicast base station device 20.

In the multicast communication state, the mobile station device 10 receives incoming call information transmitted from the multicast base station device 20 (incoming call information indicating receipt of information concerning a unicast service addressed to the mobile station device 10). In other words, the control unit 120 controls the radio communication unit 110 to receive the incoming call information in the multicast communication state. The incoming call signal is transmitted as the MBMS from the multicast base station device 20.

When the mobile station device 10 receives the incoming call signal in the multicast communication state, the mobile station device 10 terminates reception of the information concerning a multicast service according to an instruction from a user (operation indicating an order to respond to the incoming call signal) or automatically according to the setting. Then, the mobile station device 10 enters a state of transmitting and receiving information concerning a unicast service to and from the unicast base station device 50 (which is also called a unicast communication state). In other words, the control unit 120 controls, in the multicast communication state, the radio communication unit 110 to terminate reception of information concerning a multicast service from the multicast base station device 20 according to the instruction received from the user through various buttons or to the setting stored in the storing unit (not shown). Then, the control unit 120 controls the radio communication unit 110 to transmit and receive information concerning a unicast service to and from the unicast base station device 50.

A method of changing the multicast communication state to the unicast communication state is not particularly limited. For example, it may be selected whether to change the multicast communication state to the unicast communication state according to an instruction from a user (operation indicating an order to respond to an incoming call signal) or automatically according to the setting. In the case of changing the multicast communication state to the unicast communication state according to an instruction from a user (operation indicating an order to respond to an incoming call signal), if there is no instruction from a user (operation indicating an order to respond to an incoming call signal), the multicast communication state maintains (does not change to the unicast communication state).

It is preferable for the mobile station device 10 having received the incoming call signal in the multicast communication state to indicate the user that the incoming call information has been received (by means of, for example, displaying on a screen, an LED, an audio output, vibration generation, or the like). In the case of automatically changing to the unicast communication state according to the setting, the mobile station device 10 may not indicate the user that the incoming call information has been received.

As shown in FIG. 5, the mobile station device 10 ignores, in the unicast communication state, information concerning a multicast service being transmitted from the multicast base station device 20 except when receipt of information concerning a unicast service ends (i.e., maintains the unicast communication state and does not enter the multicast communication state). In other words, the control unit 120 controls the radio communication unit 110 to keep receiving information concerning a unicast service except when the control unit 120 controls the radio communication unit 110 to terminate receiving the information concerning a unicast service. When reception of the information concerning a unicast service ends, the mobile station device 10 come to be able to receive information concerning a multicast service transmitted from the multicast base station device 10 (enters the multicast and unicast waiting state from the unicast communication state). The mobile station device 10 terminates, in the unicast communication state, receiving information concerning a unicast service, for example, when transmission and reception of information concerning a unicast service ends due to an end of communication, when a lack of power occurs, when the mobile station device 10 moves outside the unicast cell area, or the like. FIG. 5 shows the case in which the mobile station device 10 is transmitting and receiving information concerning a unicast service at high speed based on the 2×2 MIMO reception. Each of the unicast base station device 50 and the mobile station device 10 has two transmission and reception antennas for MIMO transmission and reception.

Figure 6:
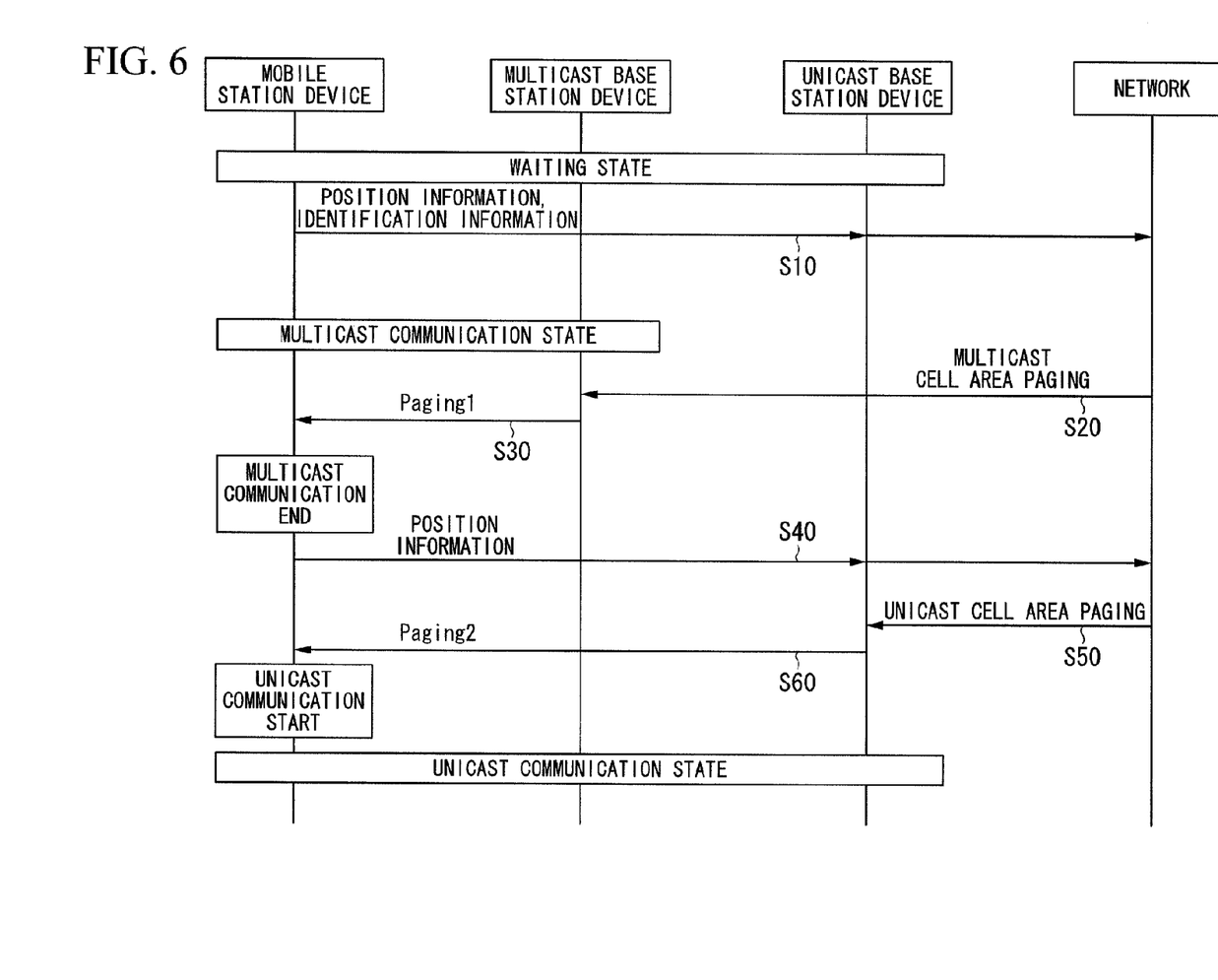
FIG. 6 is a sequence chart illustrating operation of the communication system according to the embodiment of the present invention.

FIG. 6 is a sequence chart illustrating operation of the communication system according to the embodiment of the present invention. In FIG. 6, the operations shown in the leftmost denote operations of the mobile station device 10. The operations shown in the second from the leftmost denote operations of the multicast base station device 20. The operations shown in the third from the leftmost denote operations of the unicast base station device 50. The operations shown in the rightmost denote operations of the network 70 (the server providing multicast services, the server providing unicast services, or the position register server 60). In the sequence chart shown in FIG. 6, the mobile station device 10 is assumed to be positioned in the unicast cell area and in the multicast cell area.

The mobile station device 10 positioned in the unicast cell area and the multicast cell area obtains, from each base station device, information concerning the communication system, such as a cell ID identifying each reception area (MBSFN JD and the like), a system bandwidth, and the number of antennas. In other words, the control unit 120 of the mobile station device 10 controls the radio communication unit 110 to receive information concerning the communication system.

The mobile station device 10 having received the information concerning the communication system transmits position information concerning a unicast service to the network 70 (position register server 60) via the unicast base station device 50 (step S10). Additionally, the mobile station device 10 transmits identification information (for example, MBSFN_ID) to the network 70 (position register server 60) via the unicast base station device 50 (step S10). In other words, the control unit 120 of the mobile station device 120 controls the radio communication unit 110 to transmit the position information concerning a unicast service and the identification information to the network 70 (position register server 60).

The network 70 (position register server 60) stores the position information and the identification information that have been transmitted from the mobile station device 10, while the position information and the identification information are correlated to information identifying the mobile station device 10. Thereby, the network 70 (the server providing multicast services, the server providing unicast services, and the position register server 60) can specify the unicast cell area and the multicast cell area in which the mobile station device 10 is positioned.

The mobile station device 10, which has transmitted the position information concerning a unicast service and the identification information to the network 70 (position register server 60), receives information concerning a multicast service from the multicast base station device 20 based on an instruction from a user (operation indicating an order to receive the information concerning a multicast service) or automatically based on the setting (enters the multicast communication state). In other words, the control unit 120 of the mobile station device 10 controls the radio communication unit 110 to receive information concerning a multicast service from the multicast base station device 20 according to the instruction from the user through various buttons or to the setting stored in the storing unit.

When the multicast base station device 20 receives, from the network 70 (server providing multicast services), incoming call information indicating receipt of information concerning a unicast service addressed to the mobile station device 10 while transmitting the information concerning a multicast service (multicast cell area paging) (step S20), the multicast base station device 20 transmits the incoming call information to the mobile station device 10 (step S30). In other words, the control unit 220 of the multicast base station device 20 transmits the incoming call information to the mobile station device 10, i.e., controls the radio transmission unit 211 to transmit the incoming call information to the multicast cell area when the network communication unit 200 receives incoming call information from the network 70 (server providing multicast services) (paging 1).

The multicast base station device 20 transmits the incoming call information by various methods by which the mobile station device 10 can receive the incoming call information. For example, the multicast base station device 20 transmits the incoming call information to the mobile station device 10 using a broadcast chancel or a paging channel. The broadcast channel is a channel for transmitting a signal to the entire multicast cell area, and is a broadcast channel (BCCH) described in, for example, "3GPP TS36.300 7.4 System Information, 15.3.5 MCCH Structure, D2 MBMS transmission." The paging channel is a paging channel described in "3GPP TS36.300 5.3 Transport Channels, 10.1.4 Paging and C-plane establishment."

When the incoming call information is transmitted to the entire multicast cell area using the broadcast channel (broadcast information) that is always transmitted, a receipt of the information concerning a unicast service can be notified to the mobile station device 10 in a short time.

On the other hand, when the paging channel is used, if specification of grouping and the like is previously defined, the paging channel may be monitored in a predetermined timing according to the specification. Thus, the timing for monitoring the paging channel can be minimally narrowed. Accordingly, the power consumption of the mobile station device 10 can be suppressed, and an operating time of the mobile station device 10 (for example, an MBMS content viewing time) can be increased.

The mobile station device 10 having received the incoming call information terminates receiving information concerning a multicast service according to an instruction from a user (operation indicating an order to respond to the incoming call signal) or automatically according to the setting. In other words, the control unit 120 of the mobile station device 10 controls the radio communication unit 110 to terminate receiving information concerning a multicast service from the multicast base station device 20 according to the instruction received from the user via various buttons or the like (operation indicating an order to respond to the incoming call signal) or automatically according to the setting.

After terminating receiving information concerning a multicast service, the mobile station device 10 transmits again the position information concerning the unicast service to the network 70 (position register server 60) via the unicast base station device 50 (step S40). In other words, the control unit 120 of the mobile station device 10 controls the radio communication unit 110 to transmit the position information concerning the unicast service to the network 70 (position register server 60). The network 70 (position register server 60) registers the position information transmitted from the mobile station device 10.

Then, the network 70 (server providing unicast services) transmits incoming call information to the unicast base station device 50 (unicast cell area paging) (step S50). When the unicast base station device 50 receives the incoming call information from the network 70 (server providing unicast services), the unicast base station device 50 transmits the incoming call information to the mobile station device 10 (step S60). In other words, the control unit 520 of the unicast base station device 50 transmits the incoming call information to the mobile station device 10, i.e., controls the radio communication unit 510 to transmit the incoming call information to the unicast cell area (paging 2).

The mobile station device 10 having received the incoming call information transmits and receives information concerning a unicast service to and from the unicast base station device 50 (enters the unicast communication state). In other words, the control unit 120 of the mobile station device 10 controls the radio communication unit 110 to receive the information concerning a unicast service from the unicast base station device 50. Then, the sequence ends.

If the mobile station device 10 does not terminate receiving information concerning a multicast service after the multicast base station device 20 transmits the incoming call information to the mobile station device 10 in step S30 (for example, when there is no operation indicating an order to respond to the incoming call signal or when there is a setting indicating an order to ignore the incoming call information), the process of transmitting the position information concerning the unicast service to the network 70 (position register server 60) (step S40) is not performed. Therefore, the network 70 (server providing unicast services) notifies the transmitting side that the mobile station device 10 is positioned outside the coverage area. Accordingly, the following transmission of the incoming call signal (unicast area paging, i.e., paging 2) is not performed, and unnecessary line setting procedures are omitted.

As explained above, according to the present embodiment, even while the mobile station device 10, which is compatible with unicast services and reception-dedicated multicast services using a dedicated frequency band (for example, dedicated-MBMS), receives the reception-dedicated multicast services, the mobile station device 10 can receive notification of an incoming call from the unicast services. In other words, even while the mobile station device 10 receives the reception-dedicated multicast services, the mobile station device 10 can receive notification of an incoming call from the unicast services by modifying software for the position register procedure (process), the paging procedure, the reception suspension procedure, and the like, without reconfiguring the mobile station device 10 into dual terminals to enable reception both in the above communication schemes.

According to the present embodiment, it is also possible to change the multicast communication state to the unicast communication state according to an instruction from a user (operation indicating an order to respond to an incoming call signal). Accordingly, when the user wants to receive information concerning the currently-received multicast service instead of receiving information concerning a newly-incoming unicast service, the user can keep receiving the information concerning the currently-received multicast service instead of receiving the newly-incoming unicast service.

When the mobile station device 10 moves, while receiving a multicast service, to a multicast cell area in which a multicast service different from the currently-received multicast service is provided, or when a multicast service different from the currently-received multicast service at the present position is available at the same time, it can be assumed that the mobile station device 10 obtains new identification information different from the identification information identifying the multicast cell area corresponding to the currently-received multicast service (i.e., the identification information having been registered to the network 70 (position register server 60)). In this case, the mobile station device 10 terminates receiving the currently-received multicast service upon receiving the new identification information. Then, the mobile station device 10 searches a receivable unicast base station device. Thus, the mobile station device 10 updates the identification information registered to the network 70 (position register server 60) to identification information identifying the multicast cell area corresponding to a newly-received multicast service. Then, the mobile station device 10 initiates receiving information concerning the new multicast service. Thus, the mobile station device 10 can receive notification of an incoming call from a unicast service even while the mobile station device 10 receives a new multicast service in a similar manner.

Although it has been explained in the present embodiment that the OFDM technology is used as the communication access technology used for the radio access network 80, another communication access technology is applicable. The multicast base station device 20 may transmit incoming call information as information concerning a multicast service (MBMS information), as well as transmitting incoming call information using the broadcast channel or the paging channel. In other words, the multicast base station device 20 may insert incoming call information into information concerning a multicast service, and transmit the information to the mobile station device 10.

Additionally, in the multicast communication state, information concerning a neighboring (communicatable) unicast base station device 50 may be previously notified to the mobile station device 10 as information concerning a multicast service or broadcast information on the broadcast channel, so as to reduce a time for searching a unicast base station device 50 to be used for relaying the identification information (for example, MBSFN_ID) to the network 70 (position register server 60) at the time of transmission of the identification information. In other words, the mobile station device 10 has to search a unicast base station device 50 at the time of transmitting the identification information (register a position thereof to the unicast base station device 50) since the mobile station device 10 is in an out-of-coverage state with respect to the unicast base station device 50 during the multicast communication state (for example, while receiving the dedicated-MBMS). If the mobile station device 10 previously obtains information concerning the unicast base station, however, the searching time can be reduced (or omitted). The reason that the mobile station device 10 searches the unicast base station device 50 every time the mobile station device 10 enters the multicast communication state (i.e., every time the mobile station device 10 transmits the identification information) is that the mobile station device 10 occasionally moves to another unicast cell area.

In the present embodiment, since the multicast cell area, from which incoming call information is transmitted, is specified, identification information (for example, MBSFN-ID) is registered to the network 70 (position register server 60) via the unicast base station device 50. When camping on the network 70, however, the mobile station device 10 does not have to search the unicast base station device 50 in order to transmit the identification information. This is because the mobile station device 10 can register the identification information to the network 70 (position register server 60) via the unicast base station device 50 currently-connected (in a communication available state). If the unicast base station device 50 can specify a multicast cell area from which the incoming call information is transmitted, the mobile station device 10 notifies the network 70 (server providing unicast services) or the unicast base station device 50 that the mobile station device 10 is in the multicast communication state, without transmitting the identification information to the unicast base station device 50. Thus, the multicast cell area, from which the incoming information is transmitted, can be specified.

Although the identification information identifying a multicast cell area (for example, MBSFN-ID) is registered to the network 70 (position register server 60) in the present embodiment, identification information pieces identifying reception areas of the respective multicast base station devices 20, 30, and 40 may be registered to the network 70 (position register server 60).

The "multicast" mentioned in the present embodiment means transmission to multiple destinations, and whether the destinations are a specified number of destinations or an unspecified number of destinations does not matter. In other words, the concept of "multicast" mentioned in the present embodiment does not correspond to the concept of the multicast of IPv4 in TCP/IP in which the concept of broadcast different from the concept of multicast is present, but to the concept of multicast of IPv6 in TCP/IP in which broadcast is regarded as one embodiment of the multicast.

The various processes of the mobile station device 10 explained above may be performed by recording a program for implementing each function of the mobile station device 10 (functions of the radio communication unit 110 and the control unit 120) on a computer readable recording medium, and by causing a computer system to read and execute the program recorded on the recording medium. The "computer system" may include an OS and hardware such as peripheral devices. Additionally, the "computer system" includes home page providing environments (or display environments) if the computer system utilizes the WWW system. The "computer readable recording medium" includes non-volatile writable memory such as a flexible disc, a magneto-optical disc, a ROM or a flash memory, a portable medium such as CD-ROM, and a storage device such as a hard disk built in the computer system.

The "computer readable recording medium" includes a medium that stores a program for a predetermined period of time, such as a volatile memory (for example, DRAM (Dynamic Random Access Memory)) in a computer system serving as a server or client when the program is transmitted via a network such as the Internet or a communication line such as a telephone network. The above program may be transmitted from a computer system storing the program in a storage device or the like to another computer system via a transmission medium or by a transmission wave in a transmission medium. The "transmission medium" for transmitting a program means a medium having a function of transmitting information, for example, a network (communication network) such as the Internet, or a telecommunication line (communication line) such as a telephone line. Additionally, the program may be one for implementing part of the aforementioned functions. Further, the program may be one that can implement the aforementioned functions in combination with a program already recorded on the computer system, so called a difference file (difference program).

Although the embodiment of the present invention has been explained with reference to the accompanying drawings, specific configurations are not limited to the above embodiment. Various modifications may be included in the claims without departing from the scope of the present invention.

INDUSTRIAL APPLICABILITY

The communication system of the present invention is applicable to a mobile station device and a base station device that are included in a mobile communication system, such as a cellular phone.

DESCRIPTION OF REFERENCE NUMERALS

1: communication system
10: mobile station device
20, 30, and 40: base station device (multicast base station device)
50: base station device (unicast base station device)
60: position register server (HRS)
70: network
80: radio access network
110: radio communication unit (mobile station side radio communication unit)
111: radio transmission unit
112: radio reception unit
120: control unit (mobile station side control unit)
130: duplexer
140: antenna unit
200: network communication unit
211: radio transmission unit (base station side radio communication unit)
220: control unit (base station side control unit)
240: antenna unit
500: network communication unit
510: radio communication unit
511: radio transmission unit
512: radio reception unit
520: control unit
530 and 531: duplexer
540 and 541: antenna unit

The invention claimed is:
1. A communication system comprising: a unicast base station device that is a base station device that establishes connection to a network which provides a unicast service and a multicast service, and relays information concerning the unicast service;
a multicast base station device that is a base station device that establishes connection to the network and relays information concerning the multicast service; and
a mobile station device that communicates with the unicast base station device and the multicast base station device,
wherein the multicast base station device comprises: a network communication unit; a base station side radio communication unit; and a base station side control unit that controls the network communication unit and the base station side radio communication unit, the mobile station device comprises: a mobile station side radio communication unit; and a mobile station side control unit that controls the mobile station side radio communication unit, the mobile station side control unit controls the mobile station side radio communication unit to transmit identification information to a position registration server in the network via the unicast base station device before the information concerning the multicast service is received from the multicast base station device, the identification information identifying a reception area in which the multicast service is provided, when the network communication unit receives incoming call information addressed to the mobile station device, the base station side control unit controls the base station side radio communication unit to transmit the incoming call information to the mobile station device, the identification information of the mobile station device being registered to the position register server, and the incoming call information indicating that the information concerning the unicast service has been received, and while the information concerning the multicast service is received from the multicast base station device, the mobile station side control unit controls the mobile station side radio communication unit to receive the incoming call information transmitted from the multicast base station device.

2. The communication system according to claim 1, wherein if the mobile station side radio communication unit receives the incoming call information while the mobile station side control unit controls the mobile station side radio communication unit to receive the incoming call information while the information concerning the multicast service is received from the multicast base station device, the mobile station side control unit controls the mobile station side radio communication unit to terminate receiving the information concerning the multicast service from the multicast base station and to transmit and receive the information concerning the unicast service to and from the unicast base station device.

3. The communication system according to claim 1, wherein if the mobile station side radio communication unit receives the incoming call information while the mobile station side control unit controls the mobile station side radio communication unit to receive the incoming call information while the information concerning the multicast service is received from the multicast base station device, the mobile station side control unit controls, according to an instruction from a user of the mobile station device, the mobile station side radio communication unit to terminate receiving the information concerning the multicast service from the multicast base station and to transmit and receive the information concerning the unicast service to and from the unicast base station device.

4. The communication system according to claim 1, wherein
the base station side control unit controls the base station side radio communication unit to transmit the information concerning the multicast service by a communication using a cell for distributing multimedia, and
the mobile station side control unit controls the mobile station side radio communication unit to receive the information concerning the multicast service by the communication using the cell for distributing multimedia.

5. The communication system according to claim 1, wherein
the base station side control unit controls the base station side radio communication unit to transmit the incoming call information using a broadcast channel transmitted to all the cell for distributing multimedia, and
the mobile station side control unit controls the mobile station side radio communication unit to receive the incoming call information using the broadcast channel.

6. The communication system according to claim 1, wherein
the base station side control unit controls the base station side radio communication unit to transmit the incoming call information using a paging channel to be transmitted in a predetermined timing,
the mobile station side control unit controls the mobile station side radio communication
unit to receive the incoming call information using the paging channel.

7. A base station device that establishes connection to a network which provides a unicast service and a multicast service, and relays information concerning the unicast service, the base station device comprising: a network communication unit; a radio communication unit; and a control unit that controls the network communication unit and the radio communication unit,
wherein when the network communication unit receives incoming call information addressed to the mobile station device, the control unit controls the radio communication unit to transmit the incoming call information to the mobile station device, identification information of the mobile station device being registered to a position register server in the network, the identification information identifying a reception area in which the multicast service is provided,
and the incoming call information indicating that the information concerning the unicast service has been received.

8. A mobile station device that communicates with a unicast base station device and a multicast base station device, the unicast base station device being a base station device that establishes connection to a network which provides a unicast service and a multicast service and relays information concerning the unicast service, the multicast base station device being a base station device that establishes connection to the network and relays information
concerning the multicast service, the mobile station device comprising: a radio communication unit; and a control unit that controls the radio communication unit, wherein the control unit controls the radio communication unit to transmit identification information to a position registration server in the network via the unicast base station device before the information concerning the multicast service is received from the multicast base station device, the identification information identifying a reception area in which the multicast service is provided, and
the control unit controls the radio communication unit to receive, while the information concerning the multicast service is received from the multicast base station device, incoming call information transmitted from the multicast base station device, the incoming call information indicating that the information concerning the unicast service has been received.

9. The mobile station device according to claim 8, wherein the radio communication unit comprises a plurality of transmission and reception antennas that perform MIMO transmission and reception.

10. A communication method for a communication system, the communication system comprising: a unicast base station device that is a base station device that establishes connection to a network which provides a unicast service and a multicast service, and relays information concerning the unicast service; a multicast base station device that is a base station device that establishes connection to the network and relays information concerning the
  multicast service; and a mobile station device that communicates with the unicast base station device and the multicast base station device, the communication method comprising:
  a step of transmitting, when receiving incoming call information addressed to the mobile station device, the incoming call information to the mobile station device, the incoming call information indicating that the information concerning the unicast service has been received, identification information of the mobile station device being registered to a position register server in the network, and the identification information identifying a reception area in which the multicast service is provided;
  a step of the mobile station device transmitting, before receiving the information concerning the multicast service from the multicast base station device, the identification information to the position register server via the unicast base station device; and
  a step of the mobile station device receiving the incoming call information from the multicast base station device while receiving the information concerning the multicast service from the multicast base station device.

11. A communication method for a base station device that establishes connection to a network which provides a unicast service and a multicast service, and relays information concerning the unicast service to a mobile station device, the communication method comprising:
  a step of transmitting, when receiving incoming call information addressed to the mobile station device, the incoming call information to the mobile station device, identification information of the mobile station device being registered to a position register server in the network, the identification information identifying a reception area in which the multicast service is provided, and the incoming call information indicating that the information concerning the unicast service has been received.

12. A communication method for a mobile station device that communicates with a unicast base station device and a multicast base station device, the unicast base station device being a base station device that establishes connection to a network which provides a unicast service and a multicast service and relays information concerning the unicast service, the
  multicast base station device being a base station device that establishes connection to the network and relays information concerning the multicast service, the communication method comprising:
  a step of transmitting, before receiving the information concerning the multicast service from the multicast base station device, identification information to a position registration server in the network via the unicast base station device, the identification information identifying a reception area in which the multicast service is provided; and
  a step of receiving incoming call information transmitted from the multicast base station device while receiving the information concerning the multicast service from the multicast base station device, the incoming call information indicating that the information concerning unicast service has been received.

* * * * *